Sept. 13, 1966  S. SAROVICH  3,272,313
UPWARD MAGNETIC CAN CONVEYOR
Filed Sept. 15, 1964  3 Sheets-Sheet 1
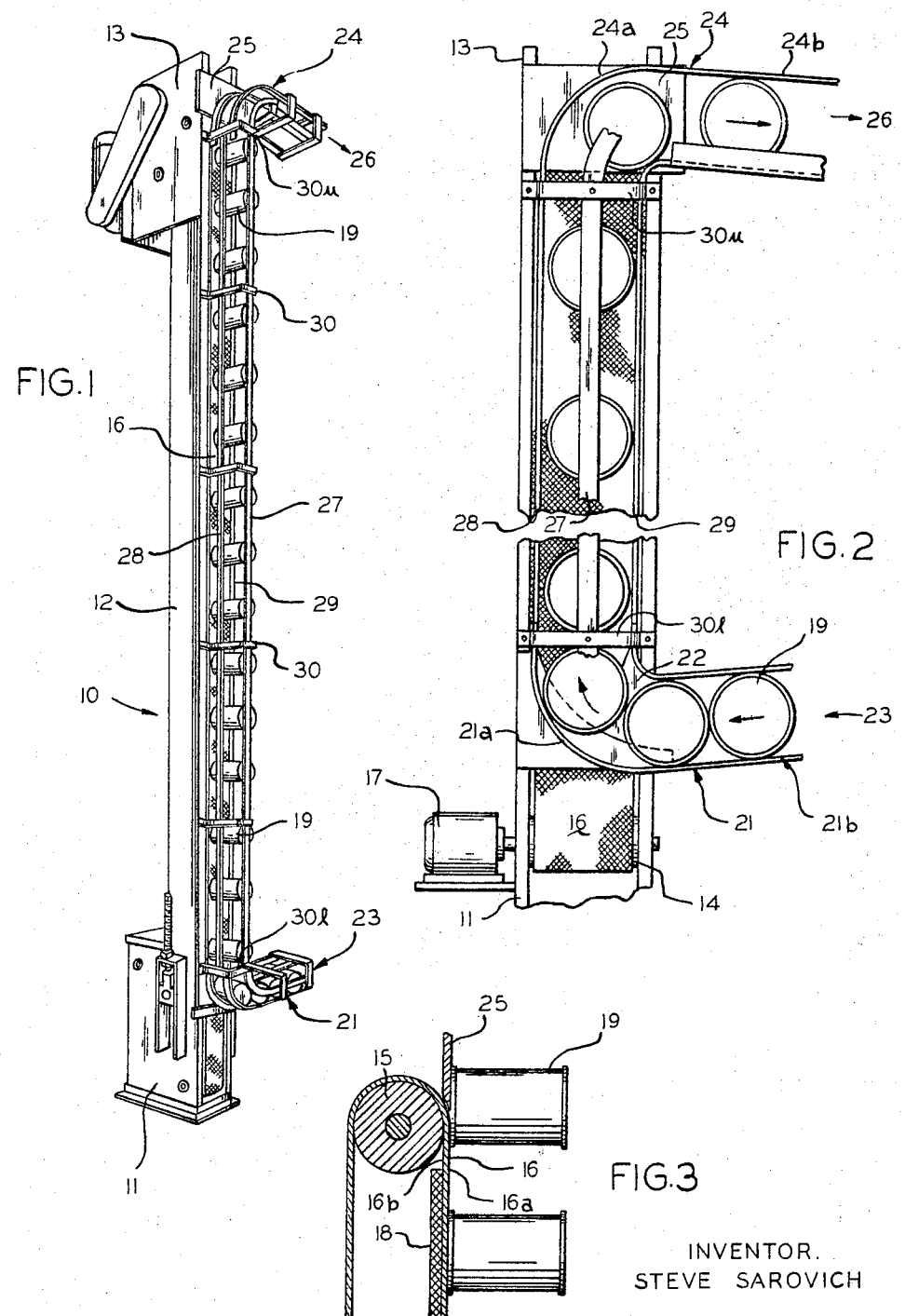
INVENTOR.
STEVE SAROVICH
BY Mullin and Alter
ATTORNEYS INVENTOR.
STEVE SAROVICH
BY Mullin and Alter
ATTORNEYS

United States Patent Office 3,272,313
Patented Sept. 13, 1966

3,272,313
UPWARD MAGNETIC CAN CONVEYOR
Steve Sarovich, Chicago, Ill., assignor to The Sardee Corporation, Chicago, Ill., a corporation of Illinois
Filed Sept. 15, 1964, Ser. No. 396,682
3 Claims. (Cl. 198—41)

This invention relates to magnetic conveyors and more particularly to magnetic conveyors for transporting containers such as cans in an upward direction.

The prior art discloses upward inclined and vertical magnetic conveyors transporting magnetic sensitive containers in an upward direction. In general, such conveyors include a drum journalled at each end of an upward extending frame having an endless conveyor belt positioned therearound and magnetic means disposed behind the belt for magnetically attracting and maintaining ferrous articles to the belt. Heretofore, the magnetic means normally used was designed to decrease in strength in order to control the point of discharge of the ferrous articles from the belt. Usually the drum journalled at the upper end of the conveyor frame was comprised of a drum shell revolving around a fixed magnetic field whose field strength was decreased therearound. The problem which often arose with these systems, especially in conveying magnetic attracting articles of a substantial weight, was that friction caused by the rubbing or the continuous bouncing of the articles against the belt upon departure therefrom produced a weakening of the belt; thereby necessitating frequent belt replacements.

A difficulty encountered in conveying cylindrical articles in the upward direction is that a relatively small portion of the total surface area of the cylindrical container is attracted to the conveyor belt in response to the magnetic force, and therefore there is the increased possibility of such containers pulling themselves away from the magnetic field due to gravity. However, if the input structure to the upward magnetic conveyor is associated with the belt so that the flat tops or bottoms of the containers rather than the cylindrical surfaces are attracted to the front of the belt, a larger surface area of said containers is thereby engaging the belt in response to the magnetic force. In this manner, the possibility of the gravitational pull exceeding the attraction of the magnetic means is no longer a problem.

It is therefore an important object of this invention to provide a magnetic conveyor including means to remove magnetic sensitive containers from its upward moving conveyor belt without producing belt damaging friction.

It is another important object of this invention to provide a magnetic conveyor with a belt which will convey cylindrical containers upward by having the containers initially positioned with their flat surfaces being attracted to said belt and finally removing said containers with a minimum of friction and wear to said belt.

When positioning the input means of the magnetic conveyor so that the flat surfaces of the cylindrical container will be attracted to the belt, it may be necessary to move the containers on their cylindrical surfaces laterally to the belt. When so doing, the flat surfaces of the containers pass adjacent to an edge of the belt before the flat surface is attracted to the front of the belt. In this arrangement, for presenting the containers to the belt, the cylinders often catch or rub against such edge, causing thereby, the fraying and tearing of the belt.

It is, therefore, another object of this invention to provide a system using a magnetic conveyor which will present the flat surfaces of cylindrical containers to the front of the belt for upward travel thereon without causing the fraying or tearing of the edge of the conveyor belt when so doing.

According to an embodiment of this invention, an upward magnetic conveyor is provided that may be described as comprising an elongated frame having a drum rotatably mounted at each end thereof with an endless conveyor belt positioned around the drums for rising and descending movement therearound. A magnetic means is associated with the frame and extends longitudinally adjacent to the back of the rising part of the belt substantially from the lower drum to the upper drum for attracting and maintaining the containers in contact with the belt as the belt travels upward. An input means presents the flat surface of containers to the belt whereby the flat surfaces of the containers are attracted to the belt in response to the magnetic pull of the magnetic means. A lower plate is tied to the frame to protect the edge of the belt when the flat side of the containers pass adjacent to the edge of the belt on the path to the position where the upward travel thereof commences. An upper plate is associated with the upper end of the frame and spaced above in substantially the same plane as the upper portion of the front of the belt to receive the containers from the belt and thereby preventing wear due to the containers following the movement of the belt for a departure therefrom. The upper plate receives the containers carried on the belt as the momentum from the upward movement of the belt ejects the containers upward and into contact with the plate. The plate provides a sliding surface for the containers to guide the containers out of the conveyor.

It is therefore an important feature of the invention herein to provide an upper plate to contact the containers after the momentum of the upward moving belt has ejected the containers upward and to guide them for removal from the conveyor. The upper plate has frictional contact with the containers and therefore eliminates harmful frictional contact with the conveyor belt upon the departure of the containers from the upward conveyor.

It is another important feature of the invention herein to provide a lower plate to protect the edge of the belt adjacent to the input means from tearing or fraying due to the rubbing or other contact with the containers as they pass adjacent to the belt edge.

It is still another important feature of the invention herein to provide input means positioned with respect to the rotating belt so that the flat surfaces of the cylindrical containers contact the belt for upward travel thereon.

For the purpose of facilitating an understanding of the invention, the accompanying drawings illustrate a preferred embodiment thereof, from an inspection of which, when considered in connection with the following description, the invention, its mode of construction, assembly and operation and other objects and advantages can be readily understood and appreciated.

Referring to the drawings, in which like characters of reference indicate corresponding or similar parts throughout the several figures of the drawings:

FIG. 1 is a perspective view of a vertical magnetic conveyor embodying the invention;

FIG. 2 is a fragmentary view illustrating that portion of the conveyor presenting containers to the belt for vertical travel thereon, and that portion of the conveyor removing containers after such containers have been ejected vertically upward from the upper portion of the belt;

FIG. 3 is a fragmentary view showing how the containers are ejected from the upper portion of the belt and thereafter come into contact with the upper plate;

Figure 4:
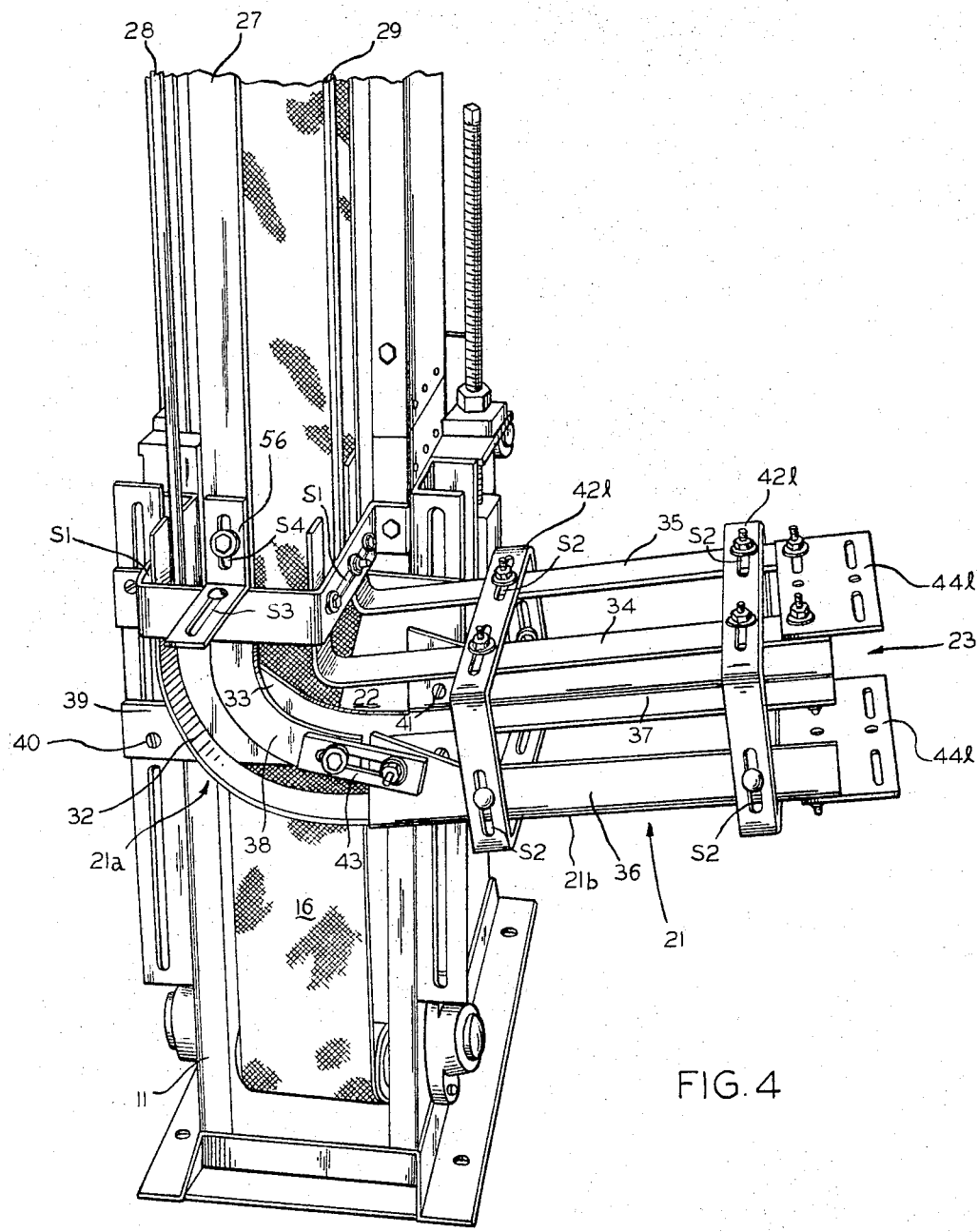
FIG. 4 is a perspective fragmentary view of the lower end of the frame, the input means and the lower plate.

Referring now to the drawings, the reference numeral 10 indicates generally a magnetic conveyor in which are incorporated the principles of the subject invention. The magnetic conveyor 10 is shown and will be described as being vertical, but the invention as used herein could also apply to upward moving magnetic conveyors other than the substantially vertical type. The frame for the magnetic conveyor 10 includes a lower end 11, an elongated member 12 and upper end 13.

Rotating means are disposed at the lower end 11 and the upper end 13 of the frame. The rotating means include lower drum 14 rotatably mounted to the lower end of the frame and upper drum 15 rotatably mounted to the upper end of the frame. A cross-sectional view of the upper drum 15 is shown in FIG. 3; and for the purpose of this description, the lower drum 14 is of the same construction. As seen from FIG. 1, the upper drum is spaced vertically substantially in line above the lower drum.

A continuous, endless conveyor belt 16, preferably of non-magnetic material, is disposed around lower drum 14 and upper drum 15. A driver means 17 (see FIG. 2) is operatively connected to the lower drum 14 for rotatably driving same. In describing the belt 16, it can be said that this belt rises from the lower drum to the upper drum and descends from the upper drum to the lower drum. With regard to the rising section of the belt only, the part near the upper drum is referred to as the upper portion and the part near the lower drum is referred to as the lower portion; an edge of the belt extends from the lower portion to the upper portion of the belt; and the thickness of the rising section affords a front side 16a and a back side 16b. Hereinafter, when referring to the belt, the rising section of the belt will be considered only.

A magnetic means 18 is associated with the frame and faces the back side 16b of the belt. The magnetic means 18 extends substantially from adjacent to the lower portion to adjacent to the upper portion of the belt for magnetically attracting and maintaining the containers 19 into contact with the front side of the belt as the belt travels upward from the lower drum 14 to the upper drum 15. Any well known magnetic means of an elongated configuration can be employed, such as, for instance, the one described in United States Patent No. 2,551,947. It must be realized, however, that the strength of the magnetic field of said magnetic means must be commensurate with the weight of the containers being conveyed upward in order that gravity is overcome.

An input means 21 is associated with the lower end 11 of the frame at the lower portion of the belt 16. The input means 21 includes a lower plate 22. The input means 21 is disposed at the lower end of the frame and positioned with respect to the belt 16 to move cylindrical containers 19 from input point 23 to the front of the lower portion of the belt for attracting thereto the flat surfaces of the containers in response to the magnetic field of the magnetic means 18. The input means 21 comprises a lower curved elbow 21a and a lower arm 21b. The lower elbow and lower arm define a path through the input frame and curves downward therefrom. The lower arm 21b is integrally connected to the lower elbow and inclines upward therefrom. The lower elbow is positioned adjacent to the belt and the lower arm is situated substantially to the side of the belt. The structure of the lower elbow and lower arm define a path through the input means 21. The containers 19 moving from input 23 are pulled downward into the lower elbow due to the gravitational force. As the containers move into the lower elbow from the lower arm for the purpose of being introduced to the belt, they pass adjacent to the edge at the lower portion of the belt. As could be readily seen from FIG. 2, the input means 21 could be disposed at either side of the frame and still present one of the flat surfaces of each container to the belt.

The lower plate 22 is disposed between the edge at the lower portion of the belt 16 and the lower elbow 21a and lower arm 21b. The lower plate 22 protects said edge from tearing and fraying when the cylindrical containers 19 move toward the belt through input means 21 and pass by said edge. The output means 24 is associated with the upper end 13 of the frame and the upper portion of the rising part of belt 16. The output means receives containers 19 from the front of the belt 16a and removes them from the magnetic conveyor 10. The output means 24 includes an upper elbow 24a and an upper arm 24b integrally connected to the upper elbow and inclining downward therefrom. The structure of said upper elbow and said upper arm define a path through the output means for the containers. The upper elbow curves upward in a direction toward the side of the frame and is positioned above the containers which are moving vertically upward on the belt. The upper arm is situated substantially to the side of the belt 16.

As seen from FIGS. 2 and 3, an upper plate 25 is disposed at the upper end 13 of the frame and adjacent to the output means 24. The upper plate 25 is situated above the upper portion of the rising part of the belt to direct the containers 19 away from the belt, thereby preventing the containers from following the belt movement without obstructing the movement of the belt. The upper plate 25 is situated adjacent to the output means 24. The upper elbow 24a receives the containers and the upper plate 25 contacts the containers as momentum from the upward movement of the belt ejects the containers upward. The upper plate 25 provides a sliding surface for the containers. The upper plate 25 forms the bottom of the path for the containers, as they are guided around the path defined by the structure of the upper elbow, and deposits the containers into the upper arm where they descend due to gravity for removal from the magnetic conveyor 10 at output point 26.

As illustrated in FIGS. 1 and 2, supporting means, including a first vertical bar 27, a second vertical bar 28 and a third vertical bar 29, are rigidly attached to the elongated portion 12 between the upper end 13 and the lower end 11 of the frame by a plurality of U-shaped brackets 30. The supporting means extend out from the frame away from the front side of the rising section of the belt and reach vertically from adjacent the lower portion to adjacent the upper portion of the belt 16 to form a passageway that retains the containers on the belt in the same relative position with respect to the belt. The U-shaped brackets 30 include means for varying the distance that the supporting means extend away from the frame, and in particular the distance that the first vertical bar 27, the second vertical bar 28 and the third vertical bar 29 extend away from the frame. In this manner, the supporting means can be adjusted to vary the dimensions of the passageway wherein the containers travel and thereby accommodate containers of various sizes. Slots S1 are included in each of the U brackets to provide the means for varying the distance of vertical bars 28 and 29 with respect to the frame. Post 56 attached to first vertical bar 27 includes slot S3. By varying the connection of the respective bars along the slots, the distance from the frame and belt is correspondingly varied. The U-shaped bracket adjacent to the input means 21 is designated 30″1″. The U-shaped bracket adjacent to the output means 24 is designated 30u.

*The input means*

Reference is now made with more particularity to FIG. 4 wherein a detailed construction of the input means is shown. The input means 21 comprises a lower plate 22, a lower elbow 21a and a lower arm 21b. The lower elbow 21a includes a first curved portion 32 and a second curved portion 33 which is nearer to the belt and frame than the first portion 32. Curved portion 32 is connected to U-shaped bracket 30″1″ along slot S1. The second curved portion 33 includes a plate segment 39 associated with the frame at point 40 for providing a firm connection to the lower end 11 of the frame.

The lower arm 21b includes a pair of top bars 34 and 35 and a pair of right-angled sections 36 and 37. Top bar 35 and right-angled section 37 are closer to the frame than bar 34 and right-angled section 36. Each of the right-angled sections is divided into a bottom and a side. The bottom of section 36 is integrally connected to the first curved portion 32. The bottom of section 37 is integrally connected to the second curved portion 33. The sections 36 and 37 curve upward toward input point 23 from their integral connections. The top bars 34 and 35 are rigidly tied to U-shaped bracket 30"1" around slot S1 and incline upward toward input point 23. A side brace 38 extends from one section 36 to the U-shaped bracket 30"1". The side of section 37 is fixedly tied to the frame adjacent to the lower plate 22 at point 41. Lower plate 22 is situated over the edge of the belt and is attached to the frame covering the edge at the lower portion of the belt which is adjacent to curved portion 33, right-angled section 37 and bar 35.

A pair of rectangular brackets 42"1" are spaced along the arm 21b. The slots S2 are conveniently placed along the rectangular brackets 42"1" for rendering the input section adjustable in order that different sized containers may be received. A slotted connector 43 is connected between the side of section 36 and the side brace 38 and the connection can be varied therebetween along the structure surrounding the slot.

A platform 44"1" is mounted to the bottom of section 36 and section 37. The platforms provide a coupling means from an outside feeding source for containers to the upward conveyor 10.

The containers 19 are fed into the upward conveyor 10 at input point 23. The structure of input means 21 defines a path therethrough. Cylindrical containers move on their cylindrical surfaces from platform 44 to right-angled sections 36 and 37. Since right-angled sections 36 and 37 are on an incline, the containers travel downward into the curved portions 32 and 33 wherein the containers face the belt 16 with their flat surfaces. Note, as the containers move past the edge of the belt into curved portions 32 and 33, plate 22 guards the edge from catching with or rubbing against the containers. The structure of the input means 21 defines a path therethrough. The slots, including slots S1 of the U-shaped brackets 30"1", slots S2 of rectangular brackets 42"1" and slotted connector 43, enable the location of the connections around the slots to be varied and thereby regulating the dimensions of the path through the input means 21 for accommodating various sized containers.

*Output means and upper plate*

Figure 5:
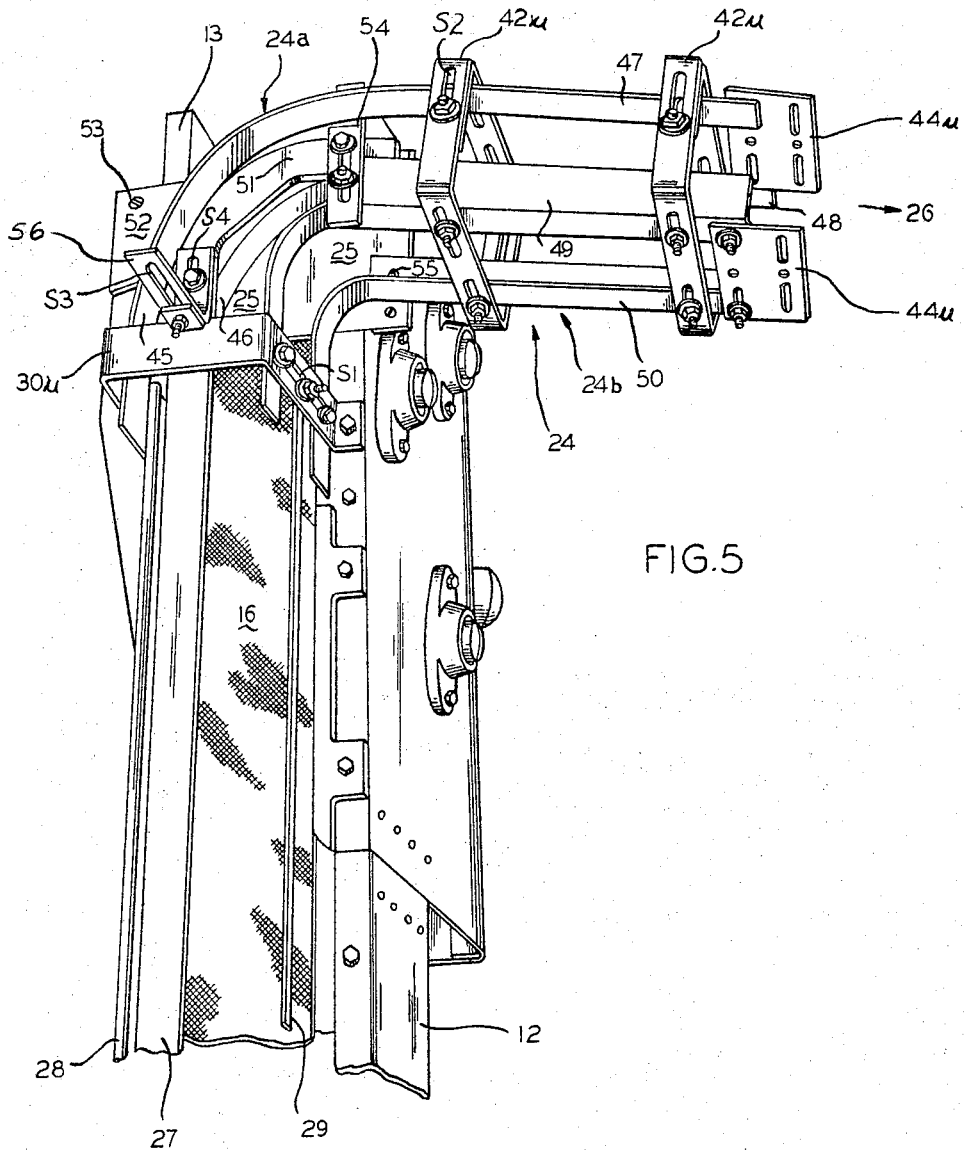
FIG. 5 is a perspective fragmentary view of the upper end of the frame, the output means and the upper plate.

The output means 24 and upper plate 25 form the output section of the magnetic conveyor to direct containers away from the belt of the magnetic conveyor. Referring more particularly to the output means 24, illustrated in FIG. 5, it comprises an upper elbow 24a and an upper arm 24b. The upper elbow includes a first curved segment 45 and a second curved segment 46 which is nearer to the frame. Curved segment 45 is connected to U-shaped bracket 30u along slot S1 (not shown). The second curved segment 46 includes a plate segment 52 which is tied to point 53 for providing a firm connection to the upper end 13 of the frame. The curved segments 45 and 46 curve upward from their connection to the frame and extend from one side to the other side of the frame.

The upper arm 24b includes a pair of top rods 47 and 48 and a pair of right-angled portions 49 and 50. Top rod 48 and angled portion 50 are nearer to the frame than rod 47 and angled portion 49. Each of the angled angled portions is divided into a bottom portion and a side portion. Each of the bottom portions curve downward and away from the side portions and are adjustably associated with the U-shaped bracket 30u along slot S1. The right-angled portions 49 and 50 curve downward toward output 26. Top rod 47 extends integrally from curved segment 45 and top rod 48 extends integrally from curved segment 46. The top rods 47 and 48 incline downward toward the output 26 from their integral connections. An upper side brace 51 extends from the side of the angled portion 49 to the U-shaped bracket 30u. The side of angled section 50 is rigidly attached to the frame at point 55. As seen from FIGS. 2 and 3, upper plate 25 is rigidly associated with the upper end 13 of the frame above the upper portion of belt 16 and is in substantially the same plane of the front of belt 16.

A pair of rectangular brackets 42u are spaced along the upper arm 24b. The slots S2 are conveniently placed along the brackets 42u for rendering the output means adjustable to accommodate different sized containers. A slotted connector 54 extends between the side portion of angled portion 50 and upper side brace 51 and the connection can be varied therebetween along the structure surrounding the slot.

A platform 44u is mounted to rods 47 and 48 and an identical platform 44u is mounted to the bottom portions of angled portions 49 and 50. The platforms provide a coupling means from the upward conveyor 10 to an outside structure for receiving the containers after they are ejected from the output means.

The containers 19 moving upward from belt 16 are driven upward into the upper elbow 24a and into contact with upper plate 25 from the upward momentum of the belt. The structure of output means 24 defines a path therethrough. The containers slide along the sliding surface of the upper plate around a path within the upper elbow determined primarily by the curved segments 45 and 46 and are led thereby into the upper arm 24b. The containers entering the upper arm slide along the bottom portions of the right-angled portions 49 and 50 in a downward direction due to gravity toward the output means 26.

*Summary of invention*

In summarizing the invention, from FIGS. 1 and 2 it can be seen that the invention herein relates to an upward magnetic conveyor having a conveyor belt positioned around a rotating means and rotating therearound in a rising and descending movement. A magnetic means attracts and maintains the containers in contact with the rising section of the belt. An input means presents containers to the front of the belt for being attracted thereto and thereafter conveyed upward. The input means provides a passageway to move the containers to the belt. A lower plate is included in the input means for protecting the edge of the belt from fraying and tearing when the containers pass adjacent thereto. An output means provides a passageway to remove the containers from the upward conveyor, once the containers are ejected from the belt and slide along the upper plate. The output means, together with the upper plate, thereby eliminates frictional contact with the belt while removing containers from the belt. The upper plate is vertically in line with the front side of the conveyor belt in the same plane thereof, just slightly above where the curving part of the belt travels around the upper drum as illustrated in FIG. 3. Therefore, as before mentioned, the containers move immediately into contact with the plate as the momentum of the belt ejects the containers upward, thereby eliminating harmful frictional contact with the belt.

It should be realized that even though the specific input and output means described herein are improvements over the prior art because of their adjustable and protective features, this invention should not be limited specifically to said input and output means. It is intended that the upper plate and lower plate can be applied, within the spirit of this invention, to conveyor sys-

What is claimed and desired to be secured by Letters Patent of the United States is:

1. An upward magnetic conveyor for conveying magnetic sensitive containers comprising:

an elongated frame having an upper and lower end;

a rotating means interposed between the upper and lower ends of said frame;

an endless conveyor belt located around said rotating means and rotating therearound, said belt including a rising section having an upper portion near the upper end of said frame and a lower portion near the lower end of said frame, and the thickness of said rising section affording a front side and a back side;

a driver means operatively connected to said rotating means for producing the rotation of said belt;

a magnetic means associated with said frame, said magnetic means facing the back side of said belt and extending substantially from adjacent said lower portion to adjacent said upper portion of said belt, for magnetically attracting and maintaining the containers into contact with said front side as said belt travels upwardly;

an input means associated with the lower end of said frame and the lower portion of said belt, said input means presenting containers to said belt for being attracted thereto in response to the magnetic field of said magnetic means;

an upper plate disposed at the upper end of said frame, said upper plate being situated above said upper portion of said belt to direct said containers away from said upper portion of said belt whereby said containers are prevented from following the movement of said belt; and an output means having an upper elbow and an upper arm integrally extending from said upper elbow, said upper arm and said upper elbow defining a path through the output means, said upper elbow being attached to the upper end of the frame and facing said upper plate, said upper arm being adjacent to said upper plate and positioned to the side of said belt, said upper elbow and said upper plate contacting said containers after said containers are ejected upwardly from said belt, said upper plate providing a sliding surface for said containers to guide said containers into said path.

2. An upward magnetic conveyor for conveying magnetic sensitive containers comprising:

an elongated frame having an upper and lower end;

a rotating means interposed between the upper and lower ends of said frame;

an endless conveyor belt located around said rotating means and rotating therearound, said belt including a rising section having an upper portion near the upper end of said frame and a lower portion near the lower end of said frame, the thickness of said rising section affording a front side and a back side;

a driver means operatively connected to said rotating means for producing the rotation of said belt;

a magnetic means associated with said frame, said magnetic means facing the back side of said belt and extending substantially from adjacent said lower portion to adjacent said upper portion of said belt, for magnetically attracting and maintaining the containers into contact with the front side of said belt as said belt travels upwardly;

an upper plate disposed at the upper end of said frame and adjacent to said output means, said upper plate being situated above said upper portion of said belt to direct said containers away from said upper portion of said belt whereby said containers are prevented from following the movement of the belt;

an input means disposed at the lower end of said frame and positioned with respect to said belt to move cylindrical containers to the front of the lower portion of said belt for attracting the flat surfaces of said cylindrical containers in response to the magnetic field of said magnetic means; and an output means associated with the upper end of said frame and said upper portion of said belt for receiving the containers from said belt and removing them from said conveyor, said plate contacting the containers as the momentum from the upward movement of the belt ejects said containers upwardly, said plate cooperating with said output means to guide said containers out of the conveyor.

3. An upward magnetic conveyor as defined in claim 1 wherein said conveyor belt includes an elongated outer edge which extends from said lower portion to said upper portion and said input means includes a lower plate, said lower plate being disposed at the lower end of said frame over said edge at the lower portion of said belt for protecting the edge from fraying and tearing when the cylindrical containers move over the edge of said belt to be positioned on said belt for being conveyed upward.

References Cited by the Examiner

UNITED STATES PATENTS

| | | | |
|---|---|---|---|
| 2,230,038 | 1/1941 | Jeromos | 193—38 |
| 2,720,302 | 10/1955 | Madden | 193—2 |
| 2,940,581 | 6/1960 | Chebuhar | 198—41 |
| 3,067,852 | 12/1962 | Barr | 198—41 |
| 3,105,720 | 10/1963 | Barker | 302—2 |
| 3,153,471 | 10/1964 | Arnett | 198—41 |

OTHER REFERENCES

German printed application 1,113,663, September 9, 1961.

EVON C. BLUNK, *Primary Examiner.*

RICHARD E. AEGERTER, *Examiner.*